J. B. F. Davidge.
Blower-Holder.

Nº 74514. Patented Feb. 18, 1868.

Witnesses
Chas. A. Scott
Chas. Rida

Inventor
J. B. F. Davidge
by atty
J. Mac Intire

United States Patent Office.

J. B. F. DAVIDGE, OF NEW YORK, N. Y.

Letters Patent No. 74,514, dated February 18, 1868.

IMPROVED BLOWER-HOLDER.

The Schedule referred to in these Letters Patent and making part of the same.

TO ALL WHOM IT MAY CONCERN:

Be it known that I, J. B. F. DAVIDGE, of New York county, in the State of New York, have invented certain new and useful Improved Blower-Holder; and I do hereby declare that the following is a full and exact description thereof, reference being had to the accompanying drawings, making part of this application.

My invention relates to a new article of manufacture, which I designate a blower-holder. The need of some convenient and effective means of handling the ordinary blower, such as is used on grates, has long been felt by the public, and to supply this want is the object of my invention, which consists in a clamping-device or jaws, provided with suitable handles, by means of which the handle of an ordinary grate-blower may be effectually and readily griped to conveniently remove said blower, when hot, from the grate; and my invention further consists in providing such a device or apparatus with a screen or shield, which effectually protects the hand of the person using it from any heat from the blower, as will be presently more fully explained.

To enable those skilled in the art to make and use my invention, I will proceed to describe more particularly one of my blower-holders, referring by letters to the accompanying drawings, in which—

Figure 1:
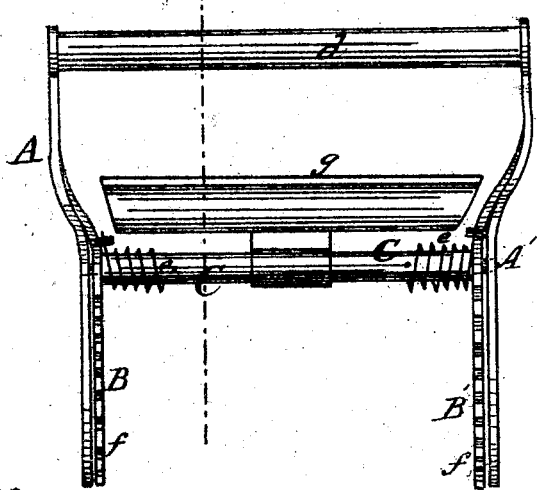

Figure 1 is a top view, and

Figure 2:
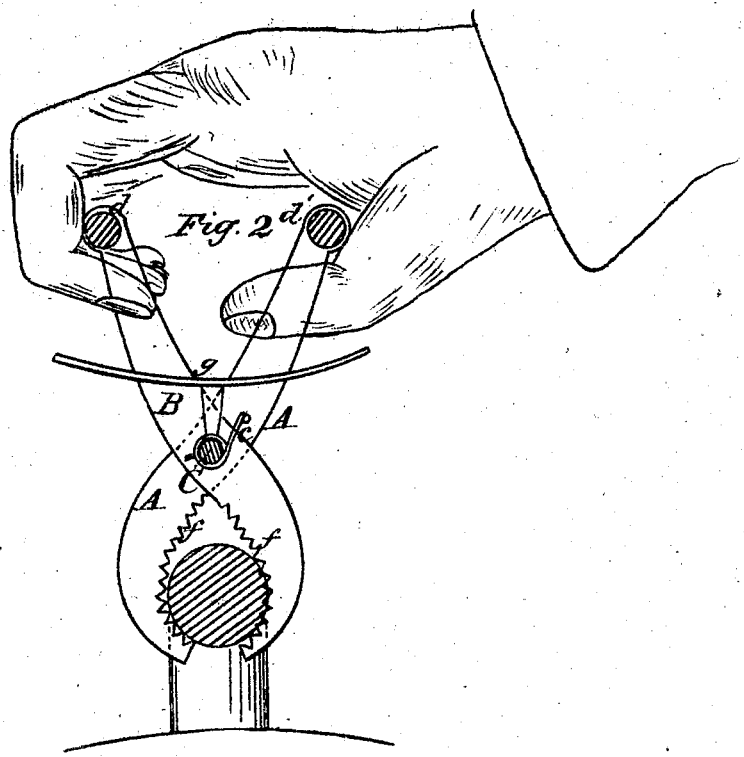

Figure 2 a side elevation of the implement or utensil.

In the several figures the same parts are designated by the same letters of reference.

A A' and B B' are four arms similarly shaped and arranged in pairs upon each end of the cross-bar C, in such a manner that, while two, B and B', are rigidly connected to said bar, the other two, A and A', are free to turn thereupon, (as illustrated by the red lines, fig. 1.)  d d' are two hand-pieces which connect the arms B B' and A A', as clearly shown, and e is a spring so arranged upon the cross-bar C as to automatically effect the distension or opening out of the jaws or arms A B, &c. These arms or jaws are formed at their griping-ends with serrations, as shown at f f, in order that they may more securely gripe the handle of a blower.  g is a sheet-metal or other suitable shield, which may be secured to one set of the arms, (or to the cross-bar C,) and is so arranged as to come between the hand of a person when griping the handles d d', and the blower (or other hot utensil) being lifted, to protect the hand from any heat which might radiate from the blower with sufficient intensity to burn or be unpleasant. The arms A A' B B' may, of course, be varied in form and proportions to suit the taste and judgment of the manufacturer, and they, as well as the other parts, may be made of any suitable and desirable materials, and may, if deemed expedient, be ornamented in any known way.

I do not propose to limit my claim of invention to the design of the implement, nor to any of the details of construction, the gist of my invention resting in the idea of the griping-jaws, and suitably-formed and arranged hand-pieces, the whole adapted to conveniently take hold of an ordinary blower-handle, and in the use, in connection with such an implement, of a screen or shield, for protecting the hand of the person using the implement from the heat of the blower or other utensil which it may be desired to handle.

It may be found expedient to vary the shape of the serrated jaws, or to dispense with the serrations, and the apparatus or implement may be found useful for lifting the covers of heated vessels, or cooking-utensil handles so shaped that they may be griped and held by such an implement as that shown and described.

I need not remark upon the advantages of the implement, since almost every one will at once see its utility and great convenience. It may be made extremely ornamental, if deemed expedient, and may be employed as a part of the fireplace furniture, and placed upon every hearth where a grate is used.

Having fully explained my new article of manufacture or new implement, what I claim as new, and desire to secure by Letters Patent, is—

An implement or apparatus composed of two sets of griping-jaws and suitable hand-pieces, the whole constructed to operate substantially in the manner described, for the purposes set forth.

I also claim the shield g, in combination with the pivoted griping-jaws and hand-pieces, the whole arranged to operate as described, for the purpose set forth.

In testimony whereof, I have hereunto set my hand and seal, this 25th day of November, 1867.

J. B. F. DAVIDGE. [L. S.]

Witnesses:
H. AUSTIN PARKE,
JABEZ S. HOLMES.